Dec. 29, 1964 A. J. ROSS 3,163,020
AUGER TYPE LIQUID FREEZING APPARATUS
Original Filed April 27, 1959 3 Sheets-Sheet 1
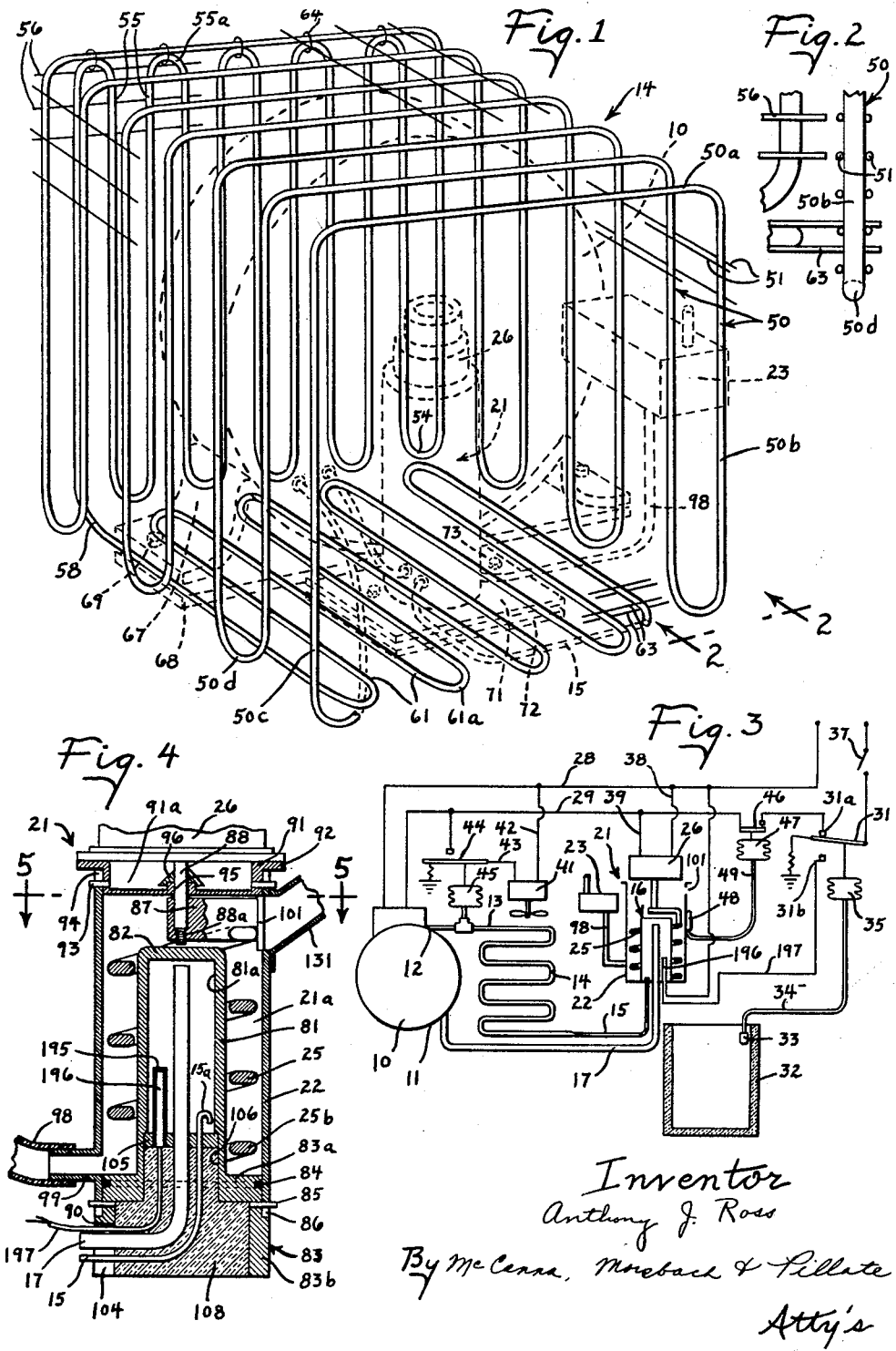
Inventor
Anthony J. Ross
By McCenna, Morebach & Pillote
Atty's Dec. 29, 1964        A. J. ROSS        3,163,020
AUGER TYPE LIQUID FREEZING APPARATUS
Original Filed April 27, 1959        3 Sheets-Sheet 2

Inventor
Anthony J. Ross
By McCanna, Moreland & Pillote
Atty's

Dec. 29, 1964     A. J. ROSS     3,163,020
AUGER TYPE LIQUID FREEZING APPARATUS
Original Filed April 27, 1959     3 Sheets-Sheet 3
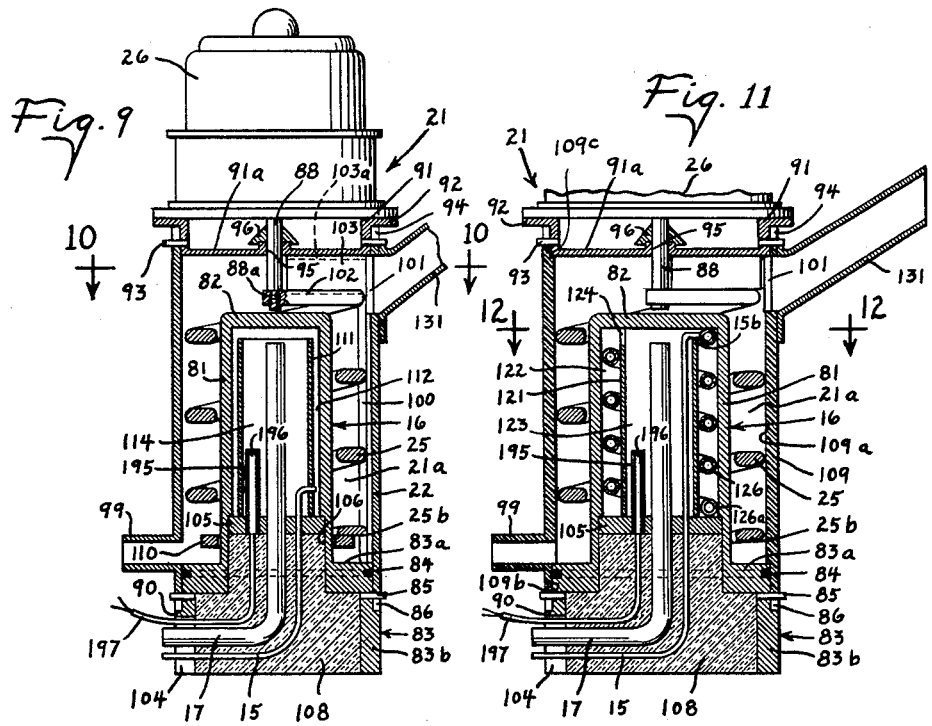
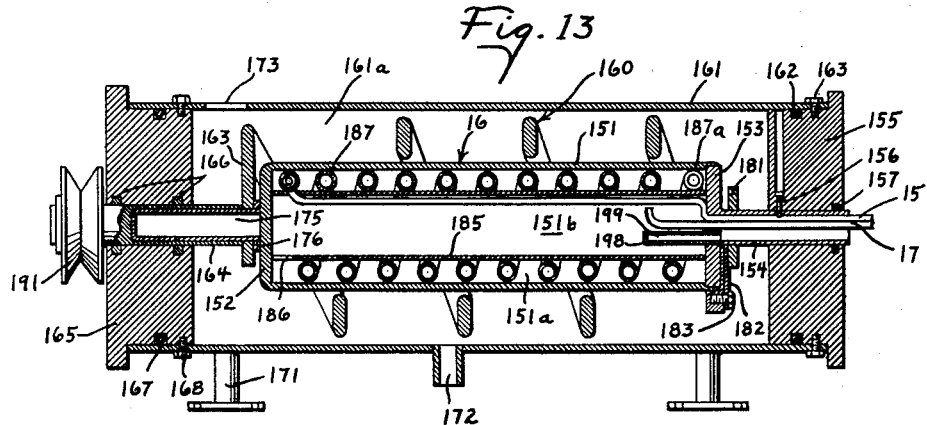
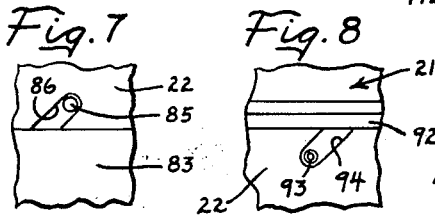

United States Patent Office 3,163,020
Patented Dec. 29, 1964

3,163,020
AUGER TYPE LIQUID FREEZING APPARATUS
Anthony J. Ross, 116 Myrtle Ave., Elmhurst, Ill.
Original application Apr. 27, 1959, Ser. No. 809,285. Divided and this application Jan. 17, 1964, Ser. No. 338,341
20 Claims. (Cl. 62—138)

This invention relates to improvements in apparatus for freezing liquids and is a division of my co-pending application Serial No. 809,285, filed April 27, 1959 and entitled "Liquid Freezing Apparatus."

An important object of this invention is to provide a liquid freezing apparatus of the type employing a liquid storage chamber, an internal evaporator in the storage chamber and an ice remover for removing frozen liquid from the walls of the evaporator, characterized in that the apparatus can be readily assembled and disassembled to enable thorough cleaning of the several parts.

Another object of this invention is to provide a liquid freezing apparatus having a freezing wall and an improved evaporator construction for more uniformly cooling the freezing wall over the entire operative surface thereof.

A further object of this invention is to provide a liquid freezing apparatus in accordance with the foregoing object and in which the refrigerant accumulator is located within the evaporator casing and so arranged as to maintain the liquified refrigerant level along the evaporator wall constant notwithstanding variations in the liquefied refrigerant level in the accumulator chamber.

Yet another object of this invention is to provide an intermittently operated freezing apparatus having a freezing wall, a refrigerating mechanism including a compressor for chilling the freezing wall, and a motor driven ice remover for removing frozen liquid from the freezing wall, and characterized by the provision of an improved arrangement for facilitating restarting of the freezing apparatus without causing abnormal loads on the ice remover motor and compressor.

Yet another object of this invention is to provide a liquid freezing apparatus having an improved arrangement for constructing the condenser and mounting the refrigerant compressor and the ice making head thereon to provide a self-contained unit which is simple and compact in construction and which can be economically fabricated.

These, together with various ancillary objects and advantages of this invention will be more readily appreciated as the same becomes better understood by reference to the following detailed description when taken in connection with the accompanying drawings wherein:

FIGURE 1 is a perspective view of the condenser coil construction with some of the cooling and reinforcing rods removed for clarity of illustration and with the compressor, ice making head and float valve shown in phantom to illustrate the manner of mounting the same on the condenser coil;

FIG. 2 is a fragmentary enlarged view on the plane 2—2 of FIG. 1, illustrating one corner of the condenser coil;

FIG. 3 is a schematic view illustrating the controls for the liquid freezing apparatus;

FIG. 4 is a vertical sectional view illustrating one form of liquid freezing head;

FIGS. 7 and 8 are fragmentary side elevational views illustrating the pin and slot construction for detachably interconnecting the parts;

FIG. 9 is a vertical sectional view through a modified form of liquid freezing head in which a refrigerant accumulator is located within the evaporator;

FIG. 11 is a vertical sectional view through a further modified form of liquid freezing head;

FIG. 13 is a longitudinal sectional view through a liquid freezing apparatus adapted to be mounted horizontally.

Figure 5:
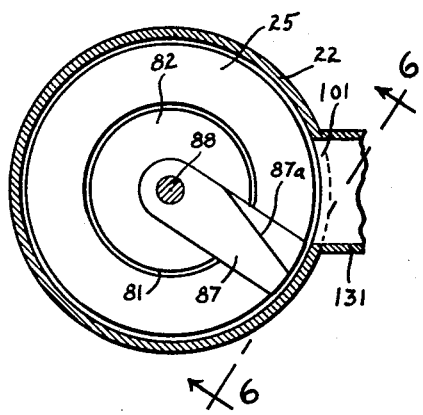
FIG. 5 is a horizontal sectional view taken on the plane 5—5 of FIG. 4.

Reference is now made more specifically to FIG. 3 of the drawings wherein there is schematically illustrated a refrigeration system including a motor driven compressor 10 having a refrigerant inlet 11 and an outlet 12. The compressed refrigerant is passed from the outlet 12 through a tube 13 to a condenser coil 14 and then liquefied refrigerant from the condenser coil is passed through a refrigerant expansion control, such as an expansion valve or the capillary tube 15 illustrated herein to an evaporator 16. The refrigerant expands in the evaporator and the gaseous refrigerant is passed through a return line 17 back to the inlet 11 of the compressor 10. The ice making head 21 of the present invention includes the evaporator 16, a liquid jacket or casing 22 for storing a quantity of liquid in contact with the walls of the evaporator, a liquid flow control valve 23 for controlling the flow of liquid to the tank to maintain a preselected liquid level therein, and a rotary ice remover 25, herein sometimes referred to as a scraper, driven by a motor 26 for removing the frozen liquid from the walls of the evaporator. The compressor motor is energized through a circuit including conductors 28 and 29 and switch apparatus is provided in the control circuit to control operation of the compressor 10, and hence control the freezing of liquid in the head 21. For reasons set forth hereinafter, a three-way switch 31 is provided in the control circuit and is movable between a position engaging contact 31a to energize the compressor motor, and a position engaging a second contact 31b. The switch 31 may be operated in any desired manner, either manually or automatically. In the specific form herein shown, the switch 31 is automatically operated to a position closing contact 31a whenever the ice level in the storage bin 32 drops below a preselected level. This may conveniently be achieved by the provision of a thermal bulb 33 at the desired level in the storage bin, which thermal bulb is connected through a capillary tube 34 to an expansible operator 35. When the ice moves out of contact with the bulb 33, the liquid in the bulb expands and moves the switch 31 upwardly into engagement with contact 31a. When the ice again contacts the bulb 33, the liquid contracts and the switch 31 moves downwardly into engagement with contact 31b. If desired, a main off-on switch 37 may be connected in series with the automatic switch 31. The ice remover drive motor 26 is also connected to the control circuit conductors 28 and 29, through lines 38 and 39. A condenser cooling fan 41 may be provided if desired to control the condenser temperature and hence the outlet pressure of the compressor. As shown herein, the fan 41 is connected to the control circuit conductors 28 and 29 through conductors 42 and 43 and a pressure responsive switch 44 which is controlled by a pressure responsive device 45 connected to the outlet side of the compressor 10. The outlet pressure of the compressor increases when the condenser temperature rises, to thereby automatically close the switch 44 and start the fan 41 which cools the condenser and reduces the outlet pressure on the compressor.

Under certain adverse conditions, as when restarting the apparatus, liquid will freeze on the evaporator at a rate faster than the motor driven ice remover can remove the frozen liquid and cause stalling of the motor 26. Advantageously, a switch 46 may be provided in the main power circuit conductor 29 and controlled automatically, as by a device 47, to open the circuit to the compressor 10 and ice remover motor 26 in the event of a freeze-up in the head 21. As shown herein, the freeze-up in the head is detected by a thermal bulb 48 which is connected by a tube 49 to the expansible device 47. The bulb may be mounted in the liquid in the jacket or in heat conducting relation to the wall of the jacket to respond to the temperature therein and operate the switch 46 to open the circuit when the liquid in the jacket freezes up. Alternatively, a conventional thermal bulb or pressure switch (not shown) may be located in the suction line 17 of the refrigerating apparatus to respond to the drop in temperature and pressure therein which occurs when the head 21 freezes up. When the compressor is shut off, the head will warm up and the switch 46 will then automatically re-close and re-start the apparatus. The drive motor 26 is advantageously either designed to withstand stalling current without burning out, or is protected by a conventional thermal overload switch, to prevent damage in the event of such a freeze-up.

The condenser 14 may be advantageously formed in the manner shown in FIGS. 1 and 2 to support the several elements including the compressor, the freezing head and the liquid level control, and to form a partial enclosure therefor. With this arrangement, the condenser has a large radiating surface and it is unnecessary in most installations to provide a condenser cooling fan such as 41. The condenser is formed from a continuous tube bent to form a plurality of U-shaped sections 50 each including a top portion 50a and side portions 50b and 50c. The U-shaped sections are disposed in spaced parallel relation and are each interconnected at their lower ends with one adjacent U-shaped section by an arcuate segment 50d which form support legs for the condenser. The U-shape sections are secured together by means of generally horizontally disposed wires or rods 51 which extend crosswise of the side and top portions of the inner and outer faces to brace the U-shape sections and to increase the heat radiating surface. The condenser "cage" may also include a rear wall which is connected to the rearmost U-shaped section 50 by an arcuate segment 54, and which rear wall includes preferably vertically extending straight sections 55 which are interconnected by arcuate segments 55a in a serpentine configuration. Parallel reinforcing and heat radiating rods 56 are also secured as by brazing or soldering to the inner and outer faces of the parallel sections 55 to extend crosswise thereof. The cage also includes a bottom or support panel which is connected by a tubular segment 58 to the end of the tube sections forming the rear panel, and which bottom panel includes straight sections 61 interconnected by arcuate segments 61a in a serpentine configuration, with the straight segments extending forwardly and rearwardly of the cage. The bottom also includes reinforcing and heat radiating rods 63 which extend crosswise of the sections 61 and preferably have the ends thereof extending outwardly to rest on one of the rods 51 on the side portions of the U-shaped sections as best shown in FIG. 2, to support the bottom of the cage. A plurality of wire ties 64 may be provided to additionally support and connect the bottom and rear walls of the cage to the side and top walls. The motor driven compressor 10 is disposed within the cage and has legs 67 clamped to the bottom wall as by a clamp plate 68 and fasteners 69. The freezer head 21 may also be provided with an enlarged base plate 71 which is clamped to the bottom, as by a plate 72 and fasteners 73. The liquid level control 23 may be mounted in any desired manner and as herein shown is mounted on the side of the cage.

The liquid freezing head 21 is designed to enable ready disassembly of the evaporator 16, the scraper 25 and the casing or jacket 21 to facilitate thorough cleaning of the several parts. As shown in FIGS. 4–12, the evaporator 16 is made in the form of a cylindrical casing 81 having a wall 82 at one end providing a closure for one end of the casing. An enlarged head or base 83 is provided on the other end of the evaporator casing and includes an outwardly extending flange portion 83a and a depending skirt portion 83b. The jacket 22 is in the form of a sleeve which surrounds the head 83 to define a liquid chamber 21a therebetween and is sealed thereto as by an O-ring 84 disposed in a peripheral groove in the head. The outer surface of the head is stepped to provide a shoulder 90 which engages the lower end of the casing 22 to support the same. The sleeve is detachably secured to the head as by pins 85 carried by the head and which extend into slots 86 in the sleeve. Advantageously, the slots 86 can be angularly spaced apart 90° from each other so as to enable the sleeve 22 and its discharge opening 101 to be positioned in different angular positions. The jacket 22 extends in spaced relation to the walls of the evaporator 81 to define a liquid chamber therebetween and the ice remover 25 is disposed in this chamber around the evaporator 81. The ice remover is preferably in the form of a resilient axially expansible and contractible helix having an inwardly extending arm 87 at one end which is attached to the drive shaft 88 of a gear head motor 26. The motor is conveniently detachably mounted on the upper end of the jacket or casing 22 to be supported thereby and, as shown herein, the motor is attached to a head 91 which is removably mounted on the upper end of the jacket. The head has an outwardly extending flange 92 to which the motor is secured, and which flange overlies the upper end of the jacket 22 to be supported thereon. The head is preferably formed with a concavity 91a in the upper face thereof to collect any oil which may drip from the motor. Oil overflow tubes 93 are provided on the head 91 to permit oil to drain from the concavity 91a, which tubes are arranged to be received in slots 94 formed in the jacket 22. The motor shaft 88 extends through a bore 95 in a central boss on the head 91, and a slinger 96 is attached to the shaft and overlies the bore to prevent the draining of oil along the shaft and through the bore. Liquid is supplied to the liquid chamber through a preferably flexible hose 98 which is connected to a nipple 99 on the water jacket 22. The control valve 23 may be of any conventional construction which will maintain the liquid level in the chamber at a level below the discharge opening 101 in the liquid jacket 22. With this arrangement, the motor 26 and head 91 may be removed, to enable cleaning of the ice remover 25, and the jacket 22 detached from the lower head 83 to facilitate cleaning of the interior walls of the jacket and the outer walls of the evaporator. While the axial pressure exerted by the screw 25 on the evaporator casing 81 will be in a direction to draw the heads 83 and 91 toward each other, the slots 86 and 94 in the jacket 22 may advantageously be of the bayonet type shown in FIGS. 7 and 8 to aid in preventing accidental detachment of the heads from the water jacket. The connection between the upper head 91 and the jacket 22 is preferably sufficiently loose to permit limited floating movement of the head and motor, as required to enable the ice remover 25 to align itself with the evaporator casing.

The refrigerant inlet and return lines 15 and 17 respectively extend through the lower head 83 into the chamber within the evaporator casing 81, so as to not interfere with the removal of the jacket 22 or ice remover 25 from the evaporator. In the embodiment shown in FIG. 4, the capillary tube 15 forming the inlet line extends in through a lateral opening 104 in the skirt portion 83b of the lower head, and then upwardly through a plug 105, into the lower end of the chamber 81a in the evaporator casing 81. The inner end 15a of the tube 15 is made U-shaped to direct the incoming refrigerant downwardly toward the bottom of the evaporator casing to agitate the refrigerant and lubricating oil and to prevent blowing the incoming refrigerant upwardly to the refrigerant outlet. The return conduit 17 also extends through the lateral opening 104 in the skirt portion of the head 83 upwardly through the plug 105 to a point adjacent the upper end of the chamber 81a. With this arrangement, the gaseous refrigerant will pass out through the return line 17, but no liquefied refrigerant will pass through the return line until the level of the liquefied refrigerant reaches the upper end of the return line 17.

As the liquefied refrigerant vaporizes, it absorbs heat and cools the walls of the casing 81 to freeze liquid thereon. However, the cooling effect is more pronounced in the portions of the evaporator casing which are contacted by liquefied refrigerant. In order to obtain substantially uniform freezing along the wall of the evaporator casing 81, it is necessary to maintain the chamber 81a in the casing 81 filled with liquefied refrigerant. Accordingly, an accumulator should be provided to assure an adequate supply of refrigerant in the system to maintain the chamber 81a filled with liquefied refrigerant.

The plug 105 is sealed to the walls of the evaporator casing 81 as by soldering or brazing and as shown herein is disposed in a counterbore 106 in the casing. The plug is disposed at a level above the head 83, and above the lower end 25b of the ice remover 25, to prevent freezing of liquid on the walls of the evaporator casing below the lower end of the ice remover which would interfere with the free rotation of the same. The portion of the casing 81 below the plug, and the hollow head 83 are filled with a suitable insulating material 108.

In the embodiment of FIGS. 4-8, the arm 87 on the upper end of the ice remover is designed to aid in feeding the frozen liquid to the discharge opening 101 in the jacket 22. The arm is preferably threaded on the lower end of the shaft 88 in abutting relation to a shoulder 88a thereon so that the arm is firmly attached to the shaft to support the ice remover concentrically of the evaporator casing 81. The arm has a substantial axial depth and closely underlies the upper head 91 and, as best shown in FIG. 5, the leading edge 87a of the arm is inclined to a radial plane through the shaft, at least along the upper portion of the arm, to urge the frozen liquid radially outwardly toward the discharge opening 101 as the arm rotates. Advantageously, the leading edge of the arm is also inclined downwardly and forwardly in the direction of rotation of the arm, to also elevate the frozen liquid engaged by the arm, while forcing the same outwardly toward the discharge opening. The ice remover 25 extends into a notch in the underside of the arm and is secured thereto, as by welding. Preferably, the upper end of the helical ice remover 25 is spaced below the upper head 91 a distance less than the lead of the helix to compress the frozen liquid between the helix and the head before discharging the frozen liquid through the opening 101.

Figure 10:
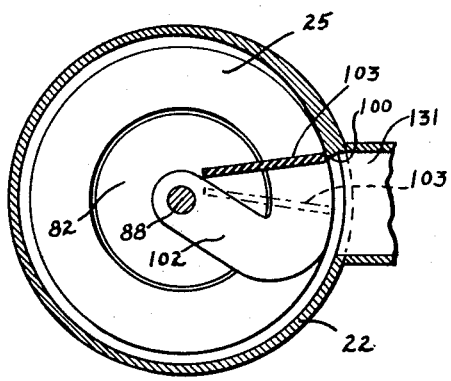
FIG. 10 is a horizontal sectional view taken on the plane 10—10 of FIG. 9.

The liquid freezing head 21 illustrated in FIGS. 9 and 10 is generally the same as that shown in FIGS. 4-8, and like numerals are utilized to designate corresponding parts. The freezing head of FIG. 9 differs primarily in the provision of a refrigerant accumulator within the evaporator casing 81 so as to eliminate the necessity of providing a separate accumulator in the refrigeration system, and to also eliminate the refrigeration losses attendant to such an external accumulator. More particularly, a sleeve 111 is mounted on the plug 105 to extend upwardly in the evaporator casing, in spaced relation thereto to define a cooling chamber 112 between the sleeve and the evaporator 81, and an accumulator chamber 114 within the sleeve 111. The refrigerant inlent line 15 extends upwardly through the plug 105 and discharges into the chamber 112 preferably adjacent its lower end. The refrigerant return line 17 extends upwardly through the plug 105 and communicates with the accumulator chamber 114 adjacent its upper end. With this arrangement, the liquefied refrigerant enters through the line 15 and into the chamber 112, the excess liquefied refrigerant passing over the top of the sleeve 111 into the central accumulator chamber. As before, the gaseous refrigerant passes outwardly through the return line 17. Thus, liquefied refrigerant is maintained in contact with the entire inner surface of the evaporator casing 81, up to the upper end of the inner sleeve 111, notwithstanding variations in the level of the liquid refrigerant within the central accumulator 114.

FIGS. 9 and 10 also illustrate a slightly modified ice remover construction and arrangement for guiding the frozen liquid to the discharge opening. As in the preceding embodiment, the arm 102 is preferably threadedly attached to the shaft 88 in abutting engagement with the shoulder 88a thereon. The arm is spaced below the head 91 and a blade 103 is positioned above the arm 102 to guide the ice toward the discharge opening 101. The blade may conveniently be attached to the underside of the head, as by a flange 103a on the blade. Advantageously, the blade may be formed of a resilient material such as rubber and extended downwardly to a level below the upper edge of the arm. As the arm rotates past the blade, it deflects the blade from its normal position. As the blade returns to its normal position, it "flicks" the frozen liquid through the discharge opening. In addition, the resilient blade minimizes the danger of injury if a finger is inserted through the discharge opening 101. The blade extends from a point adjacent the shaft 88 to the periphery of the jacket 22. The blade may be positioned to intersect the discharge opening adjacent the trailing edge of the opening, to guide loose flakes to the opening, or it may be positioned as shown in dotted lines in FIG. 10 to partially constrict the opening. This tends to compress the flake ice and produce a more dense frozen product.

At times, the ice which is removed from the evaporator casing 81 does not rapidly move upwardly in the jacket 22 and, instead, merely rotates with the ice remover 25. In order to overcome this difficulty, a shoulder 100 is formed on the inner periphery of the jacket 22 and extends closely adjacent the periphery of the screw. The shoulder extends crosswise of the convolutions of the ice remover 25 and is preferably located adjacent the trailing edge of the discharge opening. Any ice which tends to rotate with the ice remover will engage the shoulder and, when the rotation of the ice is retarded, it will move upwardly with the ice remover to the discharge opening.

In certain application such as in the larger size heads, or when the ice remover or the evaporator is formed of a material which will abrade rapidly when the two are in rubbing contact, it is desirable to radially support the free end of the ice remover 25 to prevent the same from rubbing against the evaporator. As shown in FIG. 9, an annular bearing 110 is attached to the lower end of the ice remover and slidably and rotatably surrounds the evaporator casing to radially support the ice remover, while permitting free axial expansion and contraction.

Figure 12:
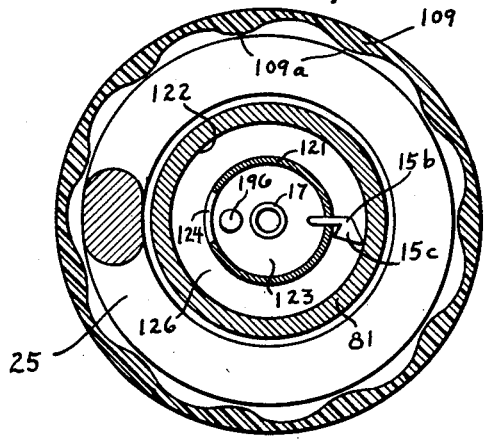
FIG. 12 is a horizontal sectional view taken on the plane 12—12 of FIG. 11.
Figure 6:
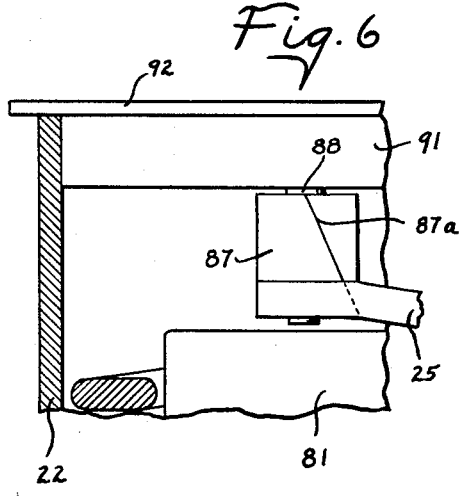
FIG. 6 is a fragmentary view taken on the plane 6—6 of FIG. 5.

The liquid freezing head 21 illustrated in FIGS. 11 and 12 is also generally similar to that shown in FIGS. 4-8, and the same numerals are utilized to designate the corresponding parts. In the embodiment of FIGS. 11 and 12, a sleeve 121 is attached to the plug 105 and extends upwardly in the casing 81, to separate the latter into an outer freezing chamber 122 and an inner accumulator chamber 123, which freezing and accumulator chambers are communicated with each other adjacent their upper ends through an opening 124 in the upper end of the sleeve. An improved arrangement is provided for passing the liquefied refrigerant through the freezing chamber 122, to cause more uniform cooling of the walls of the evaporator 81. For this purpose a helical coil 126 is disposed in the freezing chamber 122 and preferably is snugly received between the casing 81 and the sleeve 121. The refrigerant inlet line 15 extends upwardly through the plug 105 and has a portion 15b which extends through the accumulator chamber and laterally through the sleeve 121. The end of the tube 15b has a flared portion 15c which is connected to the upper end of the helical tube 126 to feed the liquefied refrigerant thereto. The liquefied refrigerant flows downwardly in the helical tube and out through the lower end 126a thereof which communicates with the freezing chamber 122. The liquefied refrigerant then flows upwardly in the freezing chamber between the convolutions of the tube to the upper end of the freezing chamber from whence it passes through the opening 124 into the central accumulator chamber 123. As will be noted, the tube 126 functions as a baffle to cause the upwardly flowing liquefied refrigerant to pass in a helical path around the walls of the casing 81. The refrigerant return lines 17, as in the preceding embodiments, communicates with the accumulator chamber 123 above its lower end. As is apparent, the tube 126 and the outer chamber 122 will remain filled with liquefied refrigerant, notwithstanding variations in the liquid level within the central accumulator chamber 123.

In order to compact and drain the frozen liquid which is delivered from the freezing heads, through the discharge openings 101 therein, an upwardly inclined discharge chute 131 may be provided. The chute 131 (see FIG. 11) is attached to the casing around the discharge opening and is inclined upwardly therefrom so that the frozen liquid must be forced by the screw 25 upwardly through the opening, to slightly compact the frozen liquid passing through the chute. In addition, any excess liquid in the frozen liquid or ice will drain back through the chute and into the chamber 21a in the packet 21.

In the embodiment of FIGS. 11 and 12, a modified arrangement is illustrated for radially guiding a spiral ice remover 25 to limit radial shifting of the ice remover relative to the central evaporator casing. The casing 109 is of a suitable "bearing" material which will not abrade or cause abrading of the ice remover when the ice remover rubs thereagainst. For example, the casing may be formed of nylon, and the casing has an undulated inner periphery defining ribs 109a which extend closely adjacent the periphery of the ice remover to prevent the ice remover from shifting into rubbing contact with the evaporator. The ribs also inhibit rotation of ice with the ice remover and thereby aid in advancing the ice to the discharge opening. In addition, the spaces between the ribs provide channels which permit liquid from the inlet 99 to flow along the ice remover and into the spaces between adjacent convolutions of the coil. The ends of the casing 109 are counterbored as indicated at 109b and 109c to provide annular surfaces which surround the heads 83 and 91 in sealed relation thereto.

A further modified form of liquid freezing head 21 is illustrated in FIG. 13, which head is particularly adapted for mounting in a horizontal position. The evaporator 16 is in the form of a tubular casing 151 having a wall 152 at one end thereof and a plug 153 connected to the other end of the casing in sealed relation therewith. A tube 154 is attached to one end of the casing and extends through an enlarged head 155. The tube is non-slidably and non-rotatably secured to the head by means of a pin 156 and an O-ring 157 is provided for sealing the interface between the tube and the head. A cylindrical jacket 161 surrounds the head and is sealed thereto by an O-ring 162, the head being non-rotatably secured to the jacket as by screws 163. As in the preceding embodiments, a helical ice remover 160 is disposed in the chamber 161a within the jacket 161 and surrounds the evaporator casing 151. The helical ice remover has an inwardly extending arm 163 at one end, which arm is secured to a tubular drive shaft 164. The shaft is rotatably supported in a head 165 and seals 166 are provided in the head for preventing leakage of liquid along the shaft. The head 165 is supported at the other end of the jacket 21 in sealed relation thereto as by O-ring 167, and screws 168 are provided for detachably securing the head in position on the jacket, and to prevent rotary and axial shifting movement of the head. The jacket may be supported in any desired manner, as by pedestals 171, and the liquid to be frozen is introduced into the chamber 161a through an opening 172 adjacent the lower end of the chamber, the frozen liquid passing outwardly from the chamber through a delivery opening 173 adjacent the upper side of the chamber.

When mounting the freezer head in a horizontal position, it is advantageous to support both ends of the evaporator casing 151. For this purpose a stub shaft 175 is secured to the end wall 152 of the evaporator casing and extends into the hollow drive shaft 164 to be radially supported thereby. A thrust washer 176 is interposed between the end wall 152, and the inwardly extending arm 163 on the screw 25 to take up the axial thrust on the shaft 164 during rotation of the scraper.

The ice remover 160 is preferably in the form of a resilient axially expansible and contractible coil which elongates and contracts as the frozen liquid breaks away from the wall of the evaporator. In order to maintain proper concentricity between the ice remover and the evaporator, provision is made for radially supporting the end of the ice remover remote from the shaft 164, while permitting axial movement of that end of the ice remover. This is achieved by the provision of a collar 181 which is rotatably supported on the tube 154 and is slidably axially therealong, and which collar is connected through a leaf spring 182 to the end of the ice remover 160, as by a fastener 183. This radially supports the free end of the ice remover, while permitting axial expansion and contraction of the ice remover. While the arrangement for radially supporting both ends of the evaporator casing, and also both ends of the ice remover is herein shown applied to a horizontally mounted liquid freezing head, it is to be understood that this construction can also be advantageously employed in the larger size vertically disposed freezing head, in order to prevent excessive lateral shifting of the ice remover relative to the central evaporator casing.

The refrigerant inlet and return conduits 15 and 17 extend through the tube 154 and through the plug 153 in sealed relation thereto. The evaporator may advantageously be provided with a built-in accumulator and for this purpose a sleeve 185 is disposed in the casing to extend between the plug 153 and the end wall 176 to separate the casing into an outer chamber 151a and an inner accumulator chamber 151b. The chambers 151a and 151b are communicated with each other adjacent one end, as through an opening 186 and a helical tube 187 is disposed in the outer chamber 151a. The inlet tube 15 extends through the chamber 151b and into communication with one end of the helical tube 187. The liquefied refrigerant flows from the tube 15 and through the helical tube 187. The other end 187a of the tube discharges into the outer chamber 151a and the liquefied refrigerant then flows back through the space between the convolutions of the tube 187 to the opening 186 and into the accumulator chamber 151b. The refrigerant return line 17 has the end 17a thereof communicating with the accumulator chamber adjacent the upper side to prevent drawing liquefied refrigerant back to the compressor. As is apparent, the shaft 164 may be driven in any desired manner and as herein shown there is provided a pulley 191 on the outer end of the shaft for connection to a suitable drive motor. While the head 21 illustrated in FIG. 13 is designed to form a frozen product such as flake ice and to discharge the same through the opening to a point of use or storage, the head is also adapted for cooling liquid in a tank. In that event the jacket 161 could be omitted and the tube 154 and shaft 164 mounted in opposed walls of the tank to support the evaporator and screw.

When the ice making apparatus is shut off after a period of operation, some difficulty is encountered when the apparatus is restarted. The torque required to drive the scraper and remove ice from the evaporator rapidly builds up after restarting the ice making apparatus, to many times the torque required during normal operation, and then gradually decreases to a normal operating torque. Consequently, in order to prevent stalling and damage to the drive motor, the drive motor 26 must have a torque output many times that which is normally required. It has been found that the provision of a heater for heating the refrigerant in the evaporator effectively overcomes these difficulties. As shown in FIGS. 3, 4, 9, and 11, a tubular sheath 195 is mounted on the plug 105 to extend into the chamber inside the evaporator casing 81, and a heater 196 is disposed in the sheath. The heater may advantageously be connected through conductors 197 to the contact 31b of the three-way switch 31, to be energized whenever the ice making apparatus is turned off. Similarly, in the embodiment shown in FIG. 13, a tubular sheath 198 may be mounted on the plug 153 to extend into the accumulator chamber 151b and an immersion heater 199 disposed in the sheath for heating the refrigerant in the accumulator chamber.

It is considered that the overloading of the compressor and scraper drive motor, upon restarting of the liquid freezing apparatus shortly after termination of a period of operation, occurs in the following manner. Since the condenser is very hot as compared to the evaporator, at the time the refrigeration apparatus is shut off, the refrigerant in the condenser will be forced under the relatively higher pressure in the condenser through the capillary tube and into the relatively cool evaporator. Within a short time after stopping the apparatus, most of the refrigerant in the system will have condensed in the evaporator; in the suction line 17, and in the inlet of the compressor. When the liquid freezing apparatus is thereafter restarted, the compressor will tend to draw liquefied refrigerant and thereby cause an abnormal load on the compressor. Further, when the compressor does begin operation, the excess liquefied refrigerant in the evaporator will vaporize rapidly and temporarily cause the evaporator temperature to drop to a very low value as compared to normal operating temperature. This causes the ice to build up on the evaporator at a higher than normal rate for a period after restarting the apparatus so that the torque required to operate the ice remover also builds up a very high value, often of the order of ten times normal operating torque. After a short further period of operating the torque required to operate the ice remover again drops back to a relatively low value. By providing the aforementioned heater for heating the evaporator, which is turned on immediately upon stopping the liquid freezing apparatus, the evaporator temperature is rapidly raised to a temperature above the remainder of the system to prevent excessive condensing of refrigerant therein. In addition, the heater helps equalize the pressures in the system and facilitates restarting of the compressor. In practice, the heater has been found to effectively eliminate the temporarily high torque load on the ice remover motor and thus permits the use of a relatively small motor as compared to those otherwise required, without danger of stalling and damage to the ice remover motor.

I claim:

1. An apparatus for freezing liquids comprising, an evaporator casing closed at one end, an enlarged head at the other end of the evaporator casing having a peripheral outer wall spaced radially outwardly from said evaporator casing, a shell detachably mounted on said outer wall and extending around the evaporator casing to form an outer chamber therebetween, refrigerant inlet and outlet passages extending through said head and communicating with said evaporator casing for passing refrigerant thereto to chill the walls of the evaporator casing, passage means communicating with said outer chamber for supplying liquid thereto, a second head detachably mounted on the other end of said shell, drive means supported on said second head for removal therewith, and an ice removing device operatively connected to said drive means and extending into said outer chamber for removing frozen liquid from the evaporator casing.

2. An apparatus for freezing liquids comprising, an evaporator casing closed at one end, an enlarged head at the other end of the evaporator casing having an outer wall spaced radially outwardly from said evaporator casing, a shell detachably mounted on said outer wall and extending around the evaporator casing to form an outer chamber therebetween, refrigerant inlet and outlet passages extending through said head and communicating with said evaporator casing for passing refrigerant thereto to chill the walls of the evaporator casing, passage means communicating with said outer chamber for supplying liquid thereto, a second head detachably mounted on the other end of said shell, and means including a helical ice remover rotatably mounted on said second head and extending into said outer chamber and surrounding said evaporator casing for removing frozen liquid therefrom.

3. An apparatus for freezing liquids comprising, an evaporator casing closed at one end, a head member at the other end of the evaporator casing, said head member having an outer peripheral wall spaced radially outwardly from the evaporator casing, an outer shell member surrounding said peripheral wall, one of said members having a groove formed in the registering faces and an O-ring in said groove for sealing the interface between said shell and head members, said shell extending in spaced relation to said evaporator casing to form an outer chamber therebetween, refrigerant inlet and return passages extending through said head and communicating with said evaporator casing to pass refrigerant thereto for chilling the walls of the evaporator casing, passage means communicating with said outer chamber for supplying liquid thereto, and means including an ice removing device disposed in said outer chamber and surrounding said evaporator casing for removing frozen liquid therefrom.

4. An apparatus for freezing liquids comprising a tubular evaporator casing closed at one end, an enlarged head at the other end of said evaporator casing, an outer shell detachably mounted on said head and extending in spaced relation to the evaporator casing to define a chamber therebetween, an ice removing device disposed in said chamber around said casing, a second head detachably secured to said shell at a point spaced axially from said one end of said casing, drive means mounted on said second head for removal therewith and operatively connected to said ice removing device for rotating the same, a plug attached to said casing defining a seal thereacross at a point spaced axially inwardly from said enlarged head to form an evaporator chamber in said casing, and refrigerant supply and return conduits extending through said plug and communicating with said evaporator chamber.

5. An ice making apparatus comprising, an evaporator casing closed at one end, an enlarged head at the other end of said evaporator casing defining an end wall extending outwardly from the evaporator casing and a peripheral wall extending around said end wall and spaced radially outwardly from said evaporator casing, means for refrigerating said evaporator casing including refrigerant inlet and return conduits extending through the head into said casing, a sleeve having one end telescopically fitting on said peripheral wall to enable ready axial removal of the sleeve therefrom, a resilient seal ring interposed between said sleeve and said head to seal the interface therebetween, a second head extending across the other end of said sleeve, drive means mounted on said second head and having a drive shaft extending therethrough, an ice removing device connected to said drive shaft and extending into the chamber between said evaporator casing and said sleeve, and quick disconnect means detachably and non-rotatably connecting said first head and said sleeve to enable easy removal of said sleeve for cleaning of the apparatus.

6. The combination of claim 5 wherein said quick disconnect means includes a pin and a slot formed on the interfitting parts of said sleeve and said head.

7. An ice making apparatus comprising, an upright evaporator casing closed at its upper end, an outer casing larger than said evaporator casing extending therearound to define a water chamber therebetween, a head having a portion loosely extending into the upper end of said outer casing to center the head on the casing and a portion overlying the upper end of said outer casing to limit movement of the head into the outer casing, drive means mounted on said head for removal therewith and having a shaft extending downwardly therethrough, an annular ice removing device connected to said shaft and extending downwardly into the water chamber around the evaporator casing, and disconnect means non-rotatably attaching said head to said outer casing while enabling limited floating of the head relative to the outer casing to facilitate alignment of the ice removing device with the evaporator casing.

8. An apparatus for freezing liquids comprising, an evaporator casing closed at one end, an enlarged head at the other end of the evaporator casing, an outer shell member having one end detachably mounted on said head, said shell member extending in spaced relation to said evaporator casing to form a chamber therebetween for receiving liquid to be frozen, refrigerant inlet and outlet passages extending through said head and communicating with said evaporator casing for passing refrigerant thereto to chill the walls of the evaporator casing, passage means communicating with said outer chamber for supplying liquid thereto, a second head detachably mounted on the other end of said shell, a self-contained motor and speed reducer unit mounted on said second head for support thereby and for removal therewith and having a drive shaft extending through said second head, and an ice removing device defining a generally annular cage open at one end to enable axial insertion and removal of the ice removing device from around the evaporator casing and having means at the other end and overlying the closed end of the evaporator casing and connected to said drive shaft for rotation thereby.

9. In an apparatus for freezing liquids, the combination of an evaporator casing closed at its upper end, an enlarged base at the lower end of the evaporator casing, said base having an annular rim coaxial with said evaporator casing and spaced radially outwardly therefrom and a shoulder extending outwardly from adjacent the lower end of the rim, a shell detachably engaging said base and extending around the evaporator casing to form an outer chamber therebetween, said shell extending around said annular rim to be centered thereby and engaging said shoulder to be axially supported thereby, refrigerant inlet and outlet passages extending through said base and communicating with said evaporator casing to pass refrigerant thereto for chilling the walls of the evaporator casing, passage means communicating with said outer chamber for supplying liquid thereto, an upper head extending across the upper end of said shell, drive means mounted on said upper head, and an ice removing device defining a generally annular cage open at one end to enable axial insertion and removal of the ice removing device from around the evaporator casing and having means at the other end operatively connected to said drive means for rotation thereby.

10. In an apparatus for freezing liquids, a tubular evaporator casing, means including an ice removing device for removing frozen liquid from the outer wall of the casing, means in said casing separating the latter into an outer compartment along the walls of the casing and an inner compartment, inlet passage means communicating with said outer compartment, for feeding refrigerant thereto, means communicating the outer compartment with the inner compartment at a preselected level above the lower end of the outer compartment to pass liquified refrigerant therefrom only after the liquid therein reaches said preselected level, and outlet passage means communicating with said inner compartment.

11. In an apparatus for freezing liquids, a tubular evaporator casing, means including an ice removing device for removing frozen liquid from the outer wall of the casing, a sleeve in said casing and spaced therefrom to define an annular outer compartment between the sleeve and casing and an inner compartment within the sleeve, a first passage means communicating with said outer compartment for feeding refrigerant thereto, means communicating said outer compartment with said inner compartment at a point disposed at a preselected level above the bottom of said outer compartment, and an outlet passage communicating with said inner compartment above the bottom thereof for passing refrigerent therefrom.

12. The combination of claim 11 including a baffle extending between said sleeve and said casing for distributing the refrigerant around said outer compartment.

13. In an apparatus for freezing liquids, a tubular evaporator casing, means including an ice removing device for removing frozen liquid from the outer wall of the casing, a sleeve in said casing and spaced therefrom to define an annular outer compartment between the sleeve and casing and an inner compartment within the sleeve, a first passage means communicating with said outer compartment for feeding refrigerant thereto, means communicating said outer compartment with said inner compartment at a point disposed at a preselected level above the bottom of said outer compartment, an outlet passage communicating with said inner compartment above the bottom thereof for passing refrigerant therefrom, and a heater immersed in the refrigerant in said inner compartment operable to heat the refrigerant therein and to warm the walls of said casing.

14. In an apparatus for freezing liquids, a tubular evaporator casing, means including an ice removing device for removing frozen liquid from the outer wall of the casing, a sleeve in said casing and spaced therefrom to define an annular outer compartment between the sleeve and casing and an inner compartment within the sleeve, a helical tube in said outer compartment, a first passage means communicating with said tube adjacent one end of the outer compartment for passing refrigerant through said tube to the other end of the outer compartment, said tube having an opening adjacent said other end of the outer compartment for discharging the refrigerant into the outer compartment for flow therethrough to said one end of the outer compartment, means communicating said outer compartment with said inner compartment adjacent said one end of the outer compartment, to pass refrigerant to said inner compartment, and outlet passage means communicating with said inner compartment for passing refrigerant from the evaporator casing.

15. The combination of claim 14 wherein the convolutions of said tube span the space between said sleeve and said casing to form a baffle.

16. An apparatus for freezing liquids comprising a tubular evaporator casing closed at one end, an enlarged head at the other end of said evaporator casing, an outer shell mounted on said head and extending in spaced relation to the evaporator casing to define a chamber therebetween, an ice removing device disposed in said chamber around said casing, a second head secured to said shell at a point spaced axially from said one end of said casing, a plug attached to said casing at a point spaced axially from said enlarged head to form an evaporator chamber in said casing, a sleeve attached to said plug and extending upwardly in said evaporator chamber to separate the latter into an outer compartment between the sleeve and the casing and a central accumulator compartment, an inlet conduit extending through said plug and communicating with said outer compartment for supplying refrigerant thereto, said sleeve having an opening adjacent its upper end for passing refrigerant from the outer compartment into the accumulator compartment, and an outlet conduit extending through said plug and communicating with said accumulator compartment above the bottom thereof.

17. In apparatus for freezing liquids, a liquid storage jacket, a drum shaped evaporator casing extending into said liquid storage jacket, means including an ice removing device for removing frozen liquid from the outer wall of said evaporator casing, an inner accumulator casing in said evaporator casing defining an accumulator compartment in said inner casing, means on one of said casings defining refrigerant flow passages extending along and around the inside of said evaporator casing, a refrigerant supply passage means communicating with said flow passage for feeding with said accumulator compartment and said refrigerant flow passage at a point spaced therealong from said supply passage means for passing refrigerant from the flow passage to the accumulator chamber, and a refrigerant outlet passage means communicating with said accumulator chamber at a point spaced above the bottom of the accumulator chamber for passing refrigerant from the accumulator chamber.

18. The combination of claim 17 wherein said refrigerant flow passage extends in helical fashion along the inside of the drum shaped evaporator casing.

19. An apparatus for freezing liquids comprising, a chilling wall, means defining a refrigerant chamber at one side of said chilling wall, means defining a liquid storage chamber at the other side of said chilling wall, means including a motor driven compressor for passing refrigerant through said refrigerant chamber to freeze a layer of liquid on said wall, motor driven ice removing means for removing liquid which solidifies on said chilling wall, means responsive to the accumulation of an excessive layer of frozen liquid on said wall for shutting off the apparatus, and means including a heater immersed in the refrigerant in said refrigerant chamber for heating the refrigerant therein when the apparatus is shut off.

20. A liquid freezing apparatus comprising a compressor, a condenser coil, a refrigerant expansion control and an evaporator connected in a closed refrigeration loop, said condenser coil comprising a tube having interconnected U-shaped portions disposed parallel to each other and defining top and side walls, said tube having parallel interconnected portions defining a bottom wall, rods extending crosswise of said parallel portions of said coil and connected thereto, said compressor being mounted on said condenser coil between said top and bottom walls, a liquid freezing head mounted on said condenser coil and including a chilling wall having one side exposed to said evaporator to be cooled thereby, and motor driven scraper means for removing liquid which solidifies on said chilling wall.

References Cited by the Examiner
UNITED STATES PATENTS

| | | | |
|---|---|---|---|
| 2,145,331 | 1/39 | Arensberg | 62—354 |
| 2,199,038 | 4/40 | Brix-Hansen | 62—354 X |
| 2,299,414 | 10/42 | Spiegl | 62—354 X |
| 2,585,020 | 2/52 | Lessard et al. | |

ROBERT A. O'LEARY, *Primary Examiner.*